(12) United States Patent
Bloom et al.

(10) Patent No.: US 7,756,804 B2
(45) Date of Patent: Jul. 13, 2010

(54) AUTOMATED MODEL BUILDING AND EVALUATION FOR DATA MINING SYSTEM

(75) Inventors: Burton H. Bloom, Lexington, MA (US); Chitra Balwant Bhagwat, Woburn, MA (US); Peter Stengard, Delray Beach, FL (US)

(73) Assignee: Oracle International Corporation, Redwood Shores, CA (US)

( * ) Notice: Subject to any disclaimer, the term of this patent is extended or adjusted under 35 U.S.C. 154(b) by 539 days.

(21) Appl. No.: 10/383,641

(22) Filed: Mar. 10, 2003

(65) Prior Publication Data

US 2003/0212678 A1 Nov. 13, 2003

Related U.S. Application Data

(60) Provisional application No. 60/378,952, filed on May 10, 2002.

(51) Int. Cl.
*G06F 17/00* (2006.01)
*G06F 7/00* (2006.01)
*G06N 5/02* (2006.01)

(52) U.S. Cl. .................................. 706/46; 707/776
(58) Field of Classification Search .................. 706/12, 706/6, 45–46, 15–16; 707/1–6, 100–102
See application file for complete search history.

(56) References Cited

U.S. PATENT DOCUMENTS

| | | | | |
|---|---|---|---|---|
| 5,516,309 A * | 5/1996 | Sayer et al. | ................ | 439/752 |
| 6,356,897 B1 * | 3/2002 | Gusack | ..................... | 707/4 |
| 6,629,095 B1 * | 9/2003 | Wagstaff et al. | ................ | 707/5 |
| 6,677,963 B1 * | 1/2004 | Mani et al. | ..................... | 706/47 |
| 6,768,982 B1 * | 7/2004 | Collins et al. | .................. | 706/45 |
| 6,813,615 B1 * | 11/2004 | Colasanti et al. | .............. | 706/46 |
| 6,912,533 B1 * | 6/2005 | Hornick | ........................ | 707/10 |
| 6,920,458 B1 * | 7/2005 | Chu et al. | .................... | 707/102 |
| 6,941,287 B1 * | 9/2005 | Vaidyanathan et al. | ......... | 706/12 |
| 6,954,758 B1 * | 10/2005 | O'Flaherty | ................... | 707/102 |
| 7,096,206 B2 * | 8/2006 | Hitt | .............................. | 706/12 |

(Continued)

OTHER PUBLICATIONS

Dasgupta, D. et al. "Designing Application-Specific Neural Networks Using the Structured Genetic Algorithm". IEEE. 1992.*

(Continued)

*Primary Examiner*—Donald Sparks
*Assistant Examiner*—Benjamin Buss
(74) *Attorney, Agent, or Firm*—Hanify & King, P.C.

(57) ABSTRACT

A method, system, and computer program product that automatically generates data mining models of adequate or even optimum quality in a way that reduces the need for user interaction and reduces the cost and improves the quality of model building. A method for automatically building and evaluating data mining models comprises the steps of receiving information specifying models to be built, generating a model setting array based on the information specifying models to be built, the model setting array including at least one model settings combination, preparing specified source data for training and testing each model to be built, for each model settings combination included in the model settings array, performing the steps of building a model based on the model settings combination, evaluating the built model, and outputting results of the model building and evaluation, and selecting a model from the built models based on a selection criterion.

31 Claims, 4 Drawing Sheets

U.S. PATENT DOCUMENTS

| | | | |
|---|---|---|---|
| 7,152,092 B2* | 12/2006 | Beams et al. | 706/45 |
| 7,280,991 B1* | 10/2007 | Beams et al. | 706/46 |
| 2002/0080169 A1* | 6/2002 | Diederiks | 345/744 |
| 2003/0171829 A1* | 9/2003 | Fisher et al. | 700/28 |

OTHER PUBLICATIONS

Lindgren,K. et al. "Regular Language Inference Using Evolving Neural Networks". IEEE. 1992.*

Caudell,T.P. "Genetic Algorithms as a Tool for the Analysis of Adaptive Resonance Theory Network Training Sets". IEEE. 1992.*

Angelov,P. et al. "Evolving Rule-Based Models: A Tool for Intelligent Adaptation". IEEE. 2001.*

Wang,L. et al. "Method of Evolutionary Neural Network-Based Intrusion Detection". IEEE. 2001.*

Goil,S. et al. "A Parallel Scalable Infrastructure for OLAP and Data Mining". Journal of Parallel and Distributed Computing. 2001.*

Ozdemir,M. "Evolutionary Computing for Feature Selection and Predictive Data Mining" Rensselaer Polytechnic Institute. Mar. 2002.*

Fathi-Torbaghan,M. et al. "The Application of Evolution Strategies to the Problem of Parameter Optimization in Fuzzy Rulebased Systems". IEEE. 1995.*

Oracle Darwin, "Darwin New Features, Release 3.7", Nov. 2000; Part No. A86078-01.

* cited by examiner

US 7,756,804 B2

AUTOMATED MODEL BUILDING AND EVALUATION FOR DATA MINING SYSTEM

CROSS-REFERENCE TO RELATED APPLICATIONS

The benefit under 35 U.S.C. §119(e) of provisional application No. 60/378,952, filed May 10, 2002, is hereby claimed.

FIELD OF THE INVENTION

The present invention relates to automated building and evaluation of data mining models for a data mining system.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database management systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior.

One application for data mining is in the analysis of data collected by companies and other organizations. These entities are amassing huge databases for a multitude of purposes including accounting, billing, profiling of customer activities and relations, manufacturing operations, web-site activity, and marketing efforts. To enhance corporate competitiveness, interest has focused on the creation of data-warehouses and the extraction of information from these warehouses. Purposes for this information include targeting marketing promotions in a cost-effective manner, improving the relevance of a web page to a visiting customer, displaying web-advertisements appropriate to the profile of a visiting customer, detecting fraudulent behavior, enhancing customer service, and streamlining operations.

One important aspect of data mining is the building of models of adequate quality, that is, models that accurately represent the data to be mined and that provide predictions of adequate quality. In conventional data mining systems, the building of quality models is a hit or miss process. A user who wishes to build a data mining model must specify a number of parameters that control the model building process and hope that those parameters will lead to a model having acceptable quality. Although conventional data mining systems may provide some tools to assess the quality of a model, the user must make the necessary adjustments in an attempt to improve the model quality, if needed. A need arises for a data mining system that provides the capability to automatically generate data mining models of adequate or even optimum quality in a way that reduces the need for user interaction and reduces the cost and improves the quality of model building.

SUMMARY OF THE INVENTION

The present invention, which may be termed "Model Seeker", is a method, system, and computer program product that automatically generates data mining models of adequate or even optimum quality in a way that reduces the need for user interaction and reduces the cost and improves the quality of model building. Model Seeker allows the user or application to conveniently specify parameters for an execution that will asynchronously build multiple data mining models, such as classification models, optionally using multiple algorithms, by systematically varying the algorithm parameters, and then will evaluate and select a "best" model. The extension features also are intended to present the user/application with settings and results information about each model built and evaluated by a Model Seeker execution so that the user/application can independently find the parameters that correspond to an alternative "best" model using a different criterion.

In one embodiment of the present invention, a method for automatically building and evaluating data mining models comprises the steps of receiving information specifying models to be built, generating a model setting array based on the information specifying models to be built, the model setting array including at least one model settings combination, preparing specified source data for training and testing each model to be built, for each model settings combination included in the model settings array, performing the steps of building a model based on the model settings combination, evaluating the built model, and outputting results of the model building and evaluation, selecting a model from among all the built models based on a selection criterion, and outputting the selected model.

The information specifying models to be built may comprise at least one of: types of models to be built, values of parameters used to build models, datasets to be used to build and test models, and parameters specifying evaluation criteria. The values of parameters used to build models may comprise a series of values for the parameters or a range of values for the parameters.

The step of generating a model setting array may comprise the steps of generating model settings combinations by varying, in different combinations, parameters included in the information specifying models to be built, and generating an array to store the generated model settings combinations.

The step of preparing specified source data to be used to training and testing each model to be built may comprise the steps of mapping source data column values to standardized forms, such as sequentially assigned integers, for use by the model building algorithms, and performing automatic assignment of groups or ranges of values to collections or bins of values each represented by an automatically assigned integer.

For each model settings combination included in the model settings array, the step of building a model based on the model settings combination may comprise the steps of choosing the appropriate code method corresponding to the user specified algorithm, or choosing a default method when the user has not made such a specification, and invoking the chosen method to build a representation of a model of the type appropriate to the chosen algorithm, and train the model with the prepared training source data.

For each model settings combination included in the model settings array, the step of evaluating the built model may comprise the step of evaluating the built model using an evaluation function. The evaluation function may comprise at least one of cumulative targets at a percentage of the population, a test of model accuracy, lift at a percentage of the population, time to build the model, and time to score the model. The evaluation function may comprise at least two of cumulative targets at a percentage of the population, a test of model accuracy, lift at a percentage of the population, time to build the model, and time to score the model.

For each model settings combination included in the model settings array, the step of outputting the results may comprises the steps of outputting at least one of cumulative targets at a percentage of the population, a test of model accuracy, lift at a percentage of the population, time to build the model, and time to score the model.

The step of selecting a model from among all the built models based on a selection criterion may comprise the step of selecting a plurality of models from among all the built models based on the selection criterion.

The selection criterion may be to choose a model with a largest value of a weighted sum of positive and negative relative accuracy, where the weight is specified as a parameter or setting. The selection criterion may comprise a figure of merit, FOM, wherein FOM=

$$\frac{W * (\text{number\_of\_correct\_positives})}{(W+1) * (\text{number\_of\_actual\_positives})} + \frac{(\text{number\_of\_correct\_positives})}{(W+1) * (\text{number\_of\_actual\_negatives})}$$

where W is greater than or equal to zero. W is determined as a ratio of a cost of predictions that are all correct except for a portion of negative predictions being false negatives, to a cost of predictions that are all correct except for a percentage of positive predictions being false positives.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The purpose of the Model Seeker is to allow the user/application to conveniently specify parameters for an execution that will asynchronously build multiple classification models, optionally using multiple algorithms, by systematically varying the algorithm parameters, and then will evaluate and select a "best" model. The extension features also are intended to present the user/application with settings and results information about each model built and evaluated by a Model Seeker execution so that the user/application can independently find the parameters that correspond to an alternative "best" model using a different criterion.

Figure 1:
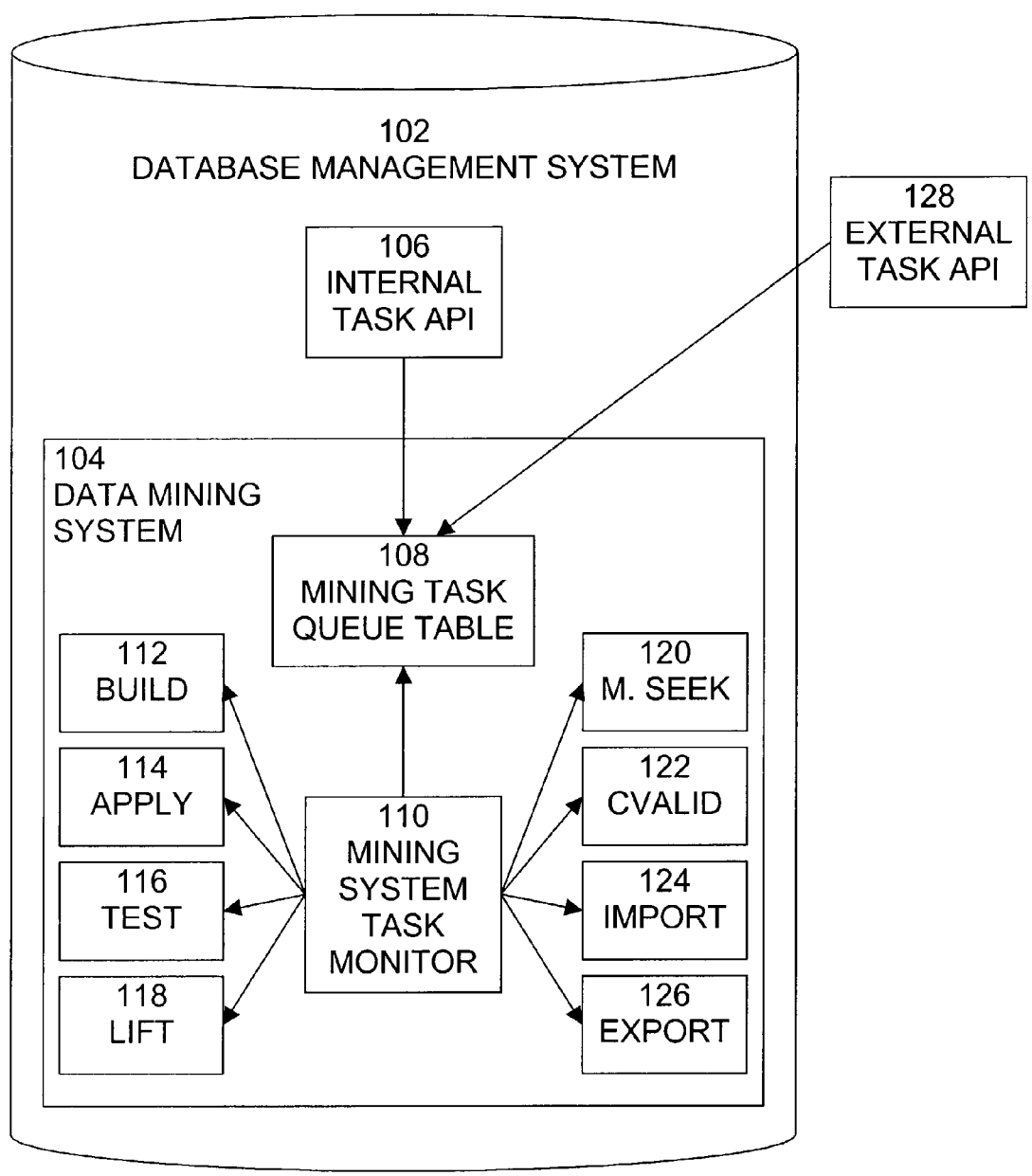
FIG. 1 is an example of a database management system 102 incorporating the model seeker functionality of the present invention.

An example of a database management system 102 incorporating the model seeker functionality of the present invention is shown in FIG. 1. Database management system (DBMS) 102 is typically implemented as a database server, which communicates with client systems and provides database services to those client applications running on those client systems. Database management system 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly you can extract information.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as structured query language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:

computerized library systems automated teller machines flight reservation systems computerized parts inventory systems Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

Database management system 102 includes data mining system (DMS) 104 and internal task application program interface (API) 106. Data mining system 104 includes mining task queue table 108, mining system task monitor 110, and a plurality of mining tasks, such as build task 112, apply task 114, test task 116, lift computation task 118, model seeker task 120, cross-validation task 122, model import task 124, and model export task 126. Internal task API 106 provides an interface to data mining system 104 for internal database application in database system 102. External task API 128 provides similar functionality for external applications, which are external to database management system 102 and which communicate with data mining system 104 through database management system 102.

Data mining system 104 performs data mining tasks in accordance with the present invention. Data mining system 104 includes mining task queue table 108, which maintains the queues that manage the performance of the data mining tasks. Internal task API 106 and external task API 128 provide an interface for applications to enqueue tasks into mining task data table 108, dequeue tasks from mining task data table 108, and manage tasks in mining task data table 108. Data mining system monitor 110 monitors the execution of the currently executing the tasks in data mining system 104, examines data mining task queue table 108, selects tasks for execution, dequeues the selected tasks from data mining task queue table 108, and initiates execution of the dequeued tasks.

Data mining system 104 provides asynchronous execution of data mining tasks, such as tasks 112-126. When the user executes a task, the task validates itself and then it will be enqueued for execution. Data mining system 104 preferably uses a First In First Out (FIFO) approach to execute the enqueued tasks. Data mining system 104 has configuration parameters to specify a maximum number of tasks that can be executed simultaneously.

Data Mining System Concepts

The present invention may be advantageously implemented in any type of data mining system. An example of one type of data mining system is described below. However, one of skill in the art would recognize that the described data mining system is only an example, and that the present invention is equally applicable to any type of data mining system.

Task API Class concepts

MiningTask

A MiningTask is a unit of work performed asynchronously by a DMS. Typically, it is defined as an abstract class. It is the common super class for all data mining task classes. A mining task will be executed asynchronously in the data mining system (DMS).

MiningDataTask

MiningDataTask is an abstract mining task, which involves data mining operations only, such as building data mining models using build task 112, scoring or applying data mining models to data using apply task 114, testing models using test task 116, lift computation using lift computation task 118, etc. MiningDataTask excludes data pre-processing tasks like data preparation, data transformations, import, and export.

ModelImportTask

ModelImportTask 124 is a mining task for importing a model in an external format to a DMS specific internal format. A model must be in the DMS internal format to perform any other operations using that model.

ModelExportTask

ModelExportTask 126 is a mining task for exporting a model to an external format from the DMS internal format.

MiningBuildTask

MiningBuildTask 112 is a mining data task for building all mining models supported by the DMS. Build operation chooses the model to be built based on the user specified mining function settings, which must be persisted in the data mining system (DMS). A MiningFunctionSetting (MFS) can be persisted in the DMS using store method. For example, the DMS may supports the building of following mining models:
   Association Rules model
   Supervised model using Naive Bayes algorithm
   Supervised model using Adaptive Bayes Network algorithm
   Clustering model
   Attribute Importance Model ClassificationTestTask ClassificationTestTask 116 is a mining data task for testing a built mining model on a dataset to find the accuracy of the model and compute a confusion matrix. Test task can be performed using any supervised model supported by the DMS.

CrossValidateTask

CrossValidateTask 122 is a special type of mining test task. Cross-validation is one technique for measuring the accuracy of a predictive model. Leave-one-out cross-validation is an especially accurate special case of cross validation, but it is ordinarily computationally expensive. In the case of Naive Bayes models, however, there is a very efficient technique for leave-one-out cross-validation, which is preferably used by the DMS.

MiningLiftTask

MiningLiftTask 118 is a mining data task used for computation of the lift, based on the specified positive target value and the number of quantiles, using the specified supervised mining model in the DMS and the task input data. Lift task can be performed using any supervised model supported by the data mining system.

A mining lift computation task 118 must do the following pre-validations before lift computation:
   1. The lift result name must be unique in the DMS lift result name space and must not exceed 64 characters
   2. Number of quantiles must be a positive number and must be in the specified boundaries i.e. 2 to 100
   3. The associated model must be a supervised mining model
   4. The associated supervised model must be built and persisted in the DMS before the execution of the lift computation
   5. Task input data must be compatible with the associated models MFS and the MFS must be a SupervisedFunctionSettings
   6. Validity of the positive target value with the models target attribute
   7. Algorithm specific validations Before submitting the lift task to the data mining system (DMS) execution queue, the client synchronously ensures validations 1 and 2. Validations 3-7 will be done asynchronously at the data mining system as part of the individual model projects.

MiningApplyTask

MiningApplyTask 114 is a mining data task for applying a built mining model on a data to find predictions (score) and associated probabilities. Apply task can be performed using any supervised model supported by the data mining system.

ModelSeekerTask

Model Seeker Task 120 is a data mining task that asynchronously builds multiple data mining models, such as classification models, optionally using multiple algorithms, by systematically varying the algorithm parameters, and then will evaluate and select a "best" model. The user or application is allowed to conveniently specify parameters and is presented with settings and results information about each model built and evaluated by a Model Seeker execution so that the user/application can independently find the parameters that correspond to an alternative "best" model using a different criterion.

A model seeker (MS) task 120 must do the following pre-validations before starting the model seek operation:

1. The associated MFS must be there in the DMS before model seek operation
2. Model seeker summary result name must be unique in the DMS MSResult name space and must not exceed 64 characters
3. Model seeker prefix must be unique in the DMS MSPrefix name space and must not exceed 15 characters
4. Number of quantiles for lift must be a positive number
5. Positive target value must be a valid target attribute used in the model build
6. Weight value that must be positive and no greater than 1.0.
7. Task input data for both build & test must be compatible with the associated MFS
8. Algorithm specific validations Before submitting the model seeker task to the DMS execution queue, client must synchronously ensure validations 1 to 6. Validations 7 and 8 will be done at the data mining system as part of asynchronous model seeker execution.

Model Seeker Concepts

Execution—the totality of asynchronous activities performed when the caller invokes the execute method of the ModelSeekerTask class.

Execution naming prefix—This is a String argument to the ModelSeekerTask (MST) constructor used to create names for the various objects created by the execution. A name for each of these objects is formed by appending a suffix to this argument.

Combination model specifications—The information needed to build a single model is contained in an instance of MiningFunctionSettings (MFS) and MiningAlgorithmSettings (MAS). When a combination of models are built of the same type by Model Seeker, the only specifications that differ from one model to another are the values for the data members of the MAS. To avoid repeating common information for many MAS instances, Model Seeker introduces several new subclasses of MAS. In particular, the classes CombinationNaiveBayesSettings and CombinationAdaptiveBayesNetworkSettings allow for an array of values for some of the corresponding single model settings attributes. For NaiveBayes models, two arrays are provided: one for the SingleThreshold property and one for the PairwiseThreshold property. The values in the two arrays for NaiveBayes are combined to create multiple pairs of values, one pair for each model to be built. For AdaptiveBayesNetwork models, an array is provided only for the MaximumNetworkFeatureDepth property. An AdaptiveBayesNetwork model is built for each value in the array.

Evaluation—Model Seeker performs a build for each model specified in the settings, and then performs two evaluation functions: test and computeLift.

"Best" model—Model Seeker chooses one of the models built by the execution as the "best" model. The criterion for choosing this model is: choose the model with the largest value for the weighted target positive and total negative relative accuracy, where the weight is specified as an argument to the ModelSeekerTask constructor.

The following formula is used to calculate the figure of merit (FOM), wherein FOM=

$$\frac{W*(\text{number\_of\_correct\_positives})}{(W+1)*(\text{number\_of\_actual\_positives})} + \frac{(\text{number\_of\_correct\_positives})}{(W+1)*(\text{number\_of\_actual\_negatives})}$$

where W is the constructor argument fWeight, a value that is greater than or equal to zero. If fWeight is <0.0, then an exception is raised.

FOM Weight—The user supplied parameter used in the calculation of the Figure Of Merit for a model. The user can determine a reasonable value for the weight as the ratio of two estimated business costs. For example, a user may choose a value for W as follows: First, the user estimates the cost to the user of predictions that are all correct, except for a random fixed percentage, such as 5%, of positive predictions being false positives. Second, the user estimates the cost to the user of predictions that are all correct except for the same random fixed percentage, such as 5%, of negative predictions being false negatives. Then, the value of W is equal to the ratio of the second estimate to the first estimate. A Weight of 1.0 means that a given percentage of false negatives has the same cost as a given percentage of false positives.

False Negative—A prediction error in which an instance that is actually of the possible class is predicted to belong to the negative class, for a binary problem, or to one of the negative classes for a multi-class problem.

False Positive—A prediction error in which an instance that is actually of the negative class, for a binary problem, or is actually of one of the negative classes for a multi-class problem, is predicted to belong to the positive class.

Functionality

The basic approach is to have the user/application input parameters that can be used to define a collection of models to be built and evaluated. Each build is performed using the same source data table or view, and each model is tested using the same second source data table or view. The number of models in the collection may become quite large. Each collection results in one "best" supervised categorical learning model being stored together with its evaluation results. All models except for the best model are deleted. The test results for all models built are retained. The choice of which model is "best" is based on a weighted sum of the percent correct of positive cases and the percent correct of all other cases treated as a single negative case.

Model Seeker Processing

Figure 2:
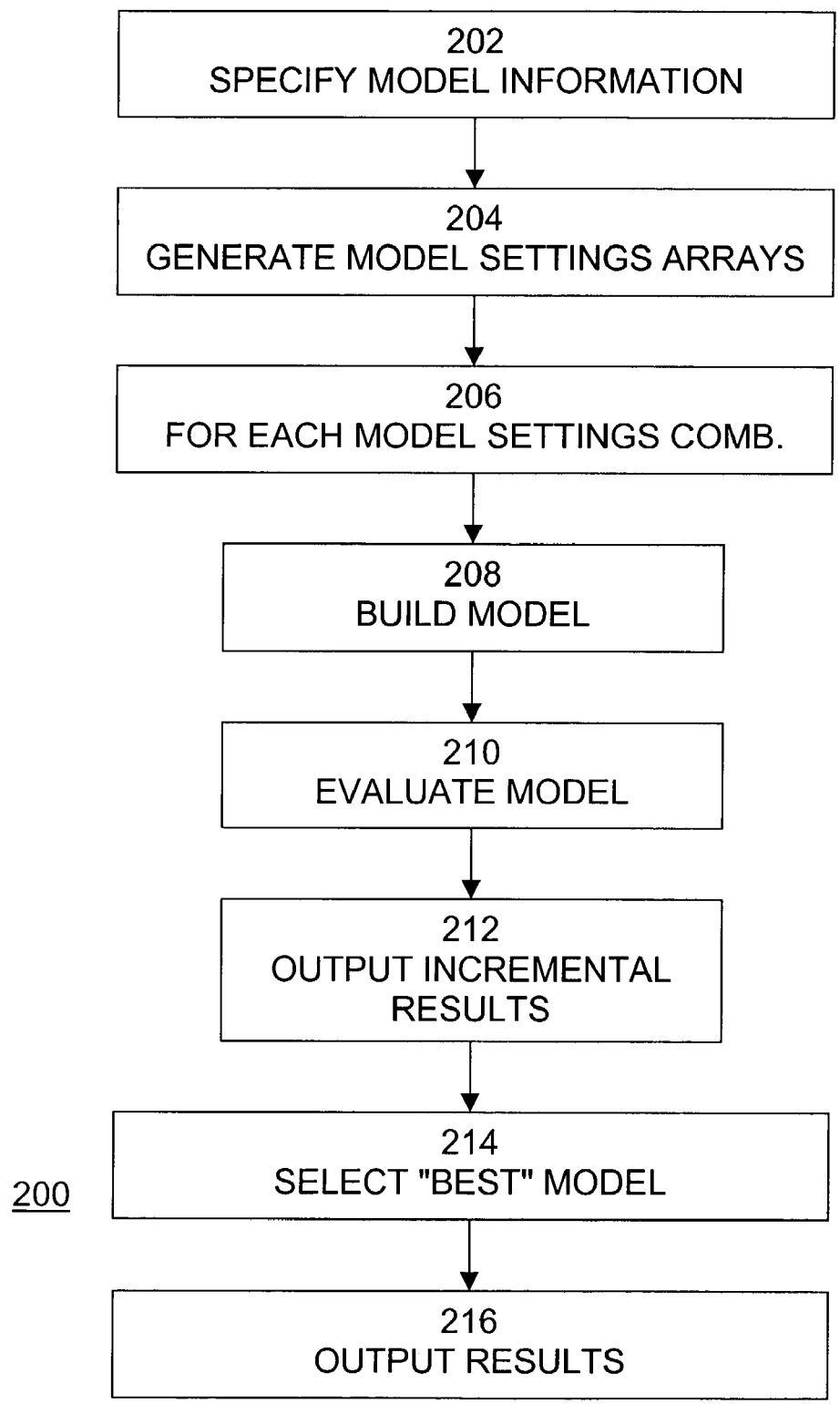
FIG. 2 is an exemplary flow diagram of processing performed by the present invention.
Figure 3:
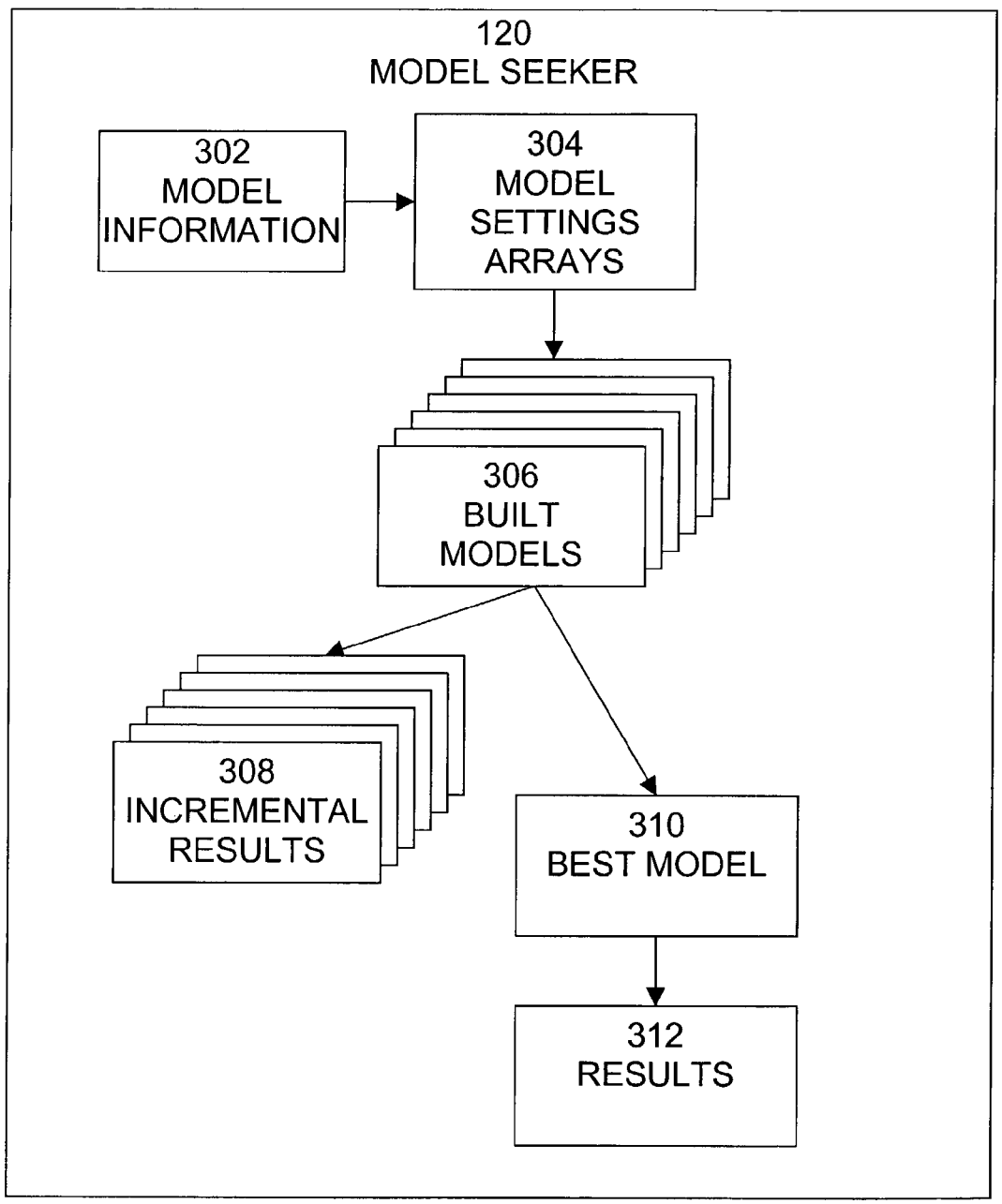
FIG. 3 is an exemplary data flow diagram of processing performed by the present invention.

An exemplary flow diagram of processing 200 performed by Model Seeker 120 is shown in FIG. 2. It is best viewed in conjunction with FIG. 3, which is a data flow diagram of process 200. Process 200 begins with step 202, in which information 302 needed to build models is specified. The information needed to build a single model is contained in an instance of MiningFunctionSettings (MFS) and MiningAlgorithmSettings (MAS). This information is specified and/or the MFS and MAS are identified in step 202. The information specified typically includes the types of models to be built, values of parameters used to build models, datasets to be used to build and test models, parameters specifying evaluation criteria, etc. The values of parameters used to build models may include series of values for the parameters, ranges of such values, etc. The precise information that is specified may depend upon the types of models to be built.

In step 204, the model settings arrays 304 are generated. Model seeker 120 builds a plurality of models using different combinations of model settings parameters. For example, Model seeker 120 can build models of different types, such as Naïve Bayes, Adaptive Bayes Network, etc. Model seeker 120 can build multiple models of the same type, but with varying model settings parameters, such as model building algorithm parameters. Likewise, Model seeker 120 can build models of different types and multiple models of each type. In order to provide these model building combinations, the parameters included in the MFS and/or the MAS are varied in different combinations. Arrays 304 are generated to store the various combinations of model settings parameters. Arrays 304 provide a plurality of combinations of values for some of the corresponding single model settings attributes. For example, for NaiveBayes models, two arrays are provided: one for the SingleThreshold property and one for the PairwiseThreshold property. The values in the two arrays for NaiveBayes are combined to create multiple pairs of values, one pair for each model to be built. For AdaptiveBayesNetwork models, an array is provided only for the MaximumNetworkFeatureDepth property. An AdaptiveBayesNetwork model is built for each value in the array.

In step 206, processing is performed for each model settings combination stored in the array or arrays generated in step 206. This processing includes steps 208 and 210. In step 208, a model, which is one of built models 306, is built for a particular model settings combination stored in the array or arrays generated in step 206. The model may be any type of classification model, as specified by the particular model settings combination being used. In step 210, the model built in step 208 is evaluated. The present invention contemplates use of only one evaluation function, or of more than one evaluation function. Examples of evaluation functions that may be used include (1) Cumulative targets at x % of the population, (2) a test of model accuracy, (3) Lift at x % of the population, (4) Time to Build, (5) Time to Score, and (6) user specified combinations. Preferably, at least two evaluation functions are used, such as a model accuracy test function and a function that computes a lift for the model.

In step 212, incremental results 308 from the model build and evaluate steps are output. As individual models complete their respective build and test activities, information relating to the results of these activities is output to the user or application for examination. For example, a user may examine the output incremental results to manually select one or more models for use before model seeker task completes all of its processing. Likewise, an application may use the output incremental results 308 to select one or more models based on customized or complex selection criteria.

In addition, process 200 may use incremental results 308 to provide for more efficient control of further processing. For example, process 200 may determine based on incremental results output at some point in time that certain model building parameter values, ranges, or combinations will not yield better models than those that have already been built and therefore process 200 may skip those values, ranges, or combinations. As an example, the accuracy of Naïve Bayes models depends upon the values of the two parameters, SingleThreshold and PairwiseThreshold, in an unpredictable way. The model that is selected as the "best" model cannot be determined without exploring various combinations. Model Seeker allows the user to either specify explicit combinations of the SingleThreshold and PairwiseThreshold values, or to specify independent series of values for the SingleThreshold and PairwiseThreshold for which Model Seeker will build and test all possible pairs of combinations. It is also possible for Model Seeker to avoid an exhaustive search of all possible pairs by using a heuristic that will cause it to stop using values of the PairwiseThreshold for a given value of the SingleThreshold whenever the figure of merit for the current PairwiseThreshold value is worse than the figure of merit for the previous PairwiseThreshold value.

In step 214, a "best" model 310 is selected from among all the models that were built, based on the evaluations performed on those models. An example of a suitable selection criterion is: choose the model with the largest value for the weighted sum of target positive and total negative relative accuracy, where the weight is specified as a parameter or setting. For example, a Figure of Merit (FOM) that may be used may be defined as: FOM=

$$\frac{W * (\text{number\_of\_correct\_positives})}{(W+1) * (\text{number\_of\_actual\_positives})} + \frac{(\text{number\_of\_correct\_positives})}{(W+1) * (\text{number\_of\_actual\_negatives})}$$

where W is the constructor argument fWeight, a value that is greater than or equal to zero. If fWeight is <0.0, then an exception is raised.

The FOM Weight is a user supplied parameter used in the calculation of the Figure Of Merit for a model. The user can determine a reasonable value for the weight as a the ratio of two estimated business costs. For example, a user may choose a value for W as follows: First, the user estimates the cost to the user of predictions that are all correct, except for a random fixed percentage, such as 5%, of positive predictions being false positives. Second, the user estimates the cost to the user of predictions that are all correct except for the same random fixed percentage, such as 5%, of negative predictions being false negatives. Then, the value of W is equal to the ratio of the second estimate to the first estimate. A Weight of 1.0 means that a given percentage of false negatives has the same cost as a given percentage of false positives. A False Negative is a prediction error in which an instance that is actually of the possible class is predicted to belong to the negative class, for a binary problem, or to one of the negative classes for a multi-class problem. A False Positive is a prediction error in which an instance that is actually of the negative class, for a binary problem, or is actually of one of the negative classes for a multi-class problem, is predicted to belong to the positive class.

Typically, a single "best" model is selected in step 214. However, the present invention contemplates selection of a plurality of "best" models or allowing the application to obtain all built models, so that the application can use an alternative method of selecting the "best" model without having to rebuild the models.

In step 216, results 312 including the selected "best" model (or models), along with information relating to the build and evaluation of the model (or models), is output by the Model Seeker 120.

Overview of Model Seeker Features

The present invention may be advantageously implemented in any type of data mining system. An example of implementation details related to Model Seeker 120 in an exemplary data mining system is described below. However, one of skill in the art would recognize that the described implementation is only an example, and that the present invention contemplates any particular implementation.

1. Model Seeker is integrated as part of the data mining API product.
2. To use the Model Seeker feature, the user/application creates a single Model Seeker Task (MST) instance that holds the information needed to perform the Model Seeker function.
3. The inputs that control which candidate models are to be built and evaluated are embedded in new subclasses of the Mining Function Settings (MFS) and Mining Algorithm Settings (MAS) classes.
4. The MST execute method is performed asynchronously. The method returns as soon as the work for the execution is initiated.
5. After a return from invoking the execute method, the static getStatus method may be called which returns an object with the current status as an enumerated type value. See the MiningTask functional specification—MiningTaskStatus.
6. After the ModelSeekerTask.execute method completes, the getResults method may be called which returns an instance of the class, ModelSeekerResult. This class includes an array of ModelSeekerResultEntry objects that contain summary information about each model built and evaluated. (The result object names can be used with the appropriate class restore method to get access to the contents of these objects.) The class also contains an index value to identify the "best" model among those named in the array. Only the "best" model remains in the data mining schema after execute completes; the other models built and evaluated by Model seeker 120 are removed automatically. This is intended to minimize the space needed for all of the models built by Model seeker 120. Alternatively, a plurality or all of the built models may be retained in the data mining schema, and/or the incremental results may be obtained before execution has been completed.
7. The models to be built and evaluated can be a combination of Naive Bayes (NB) and Adaptive Bayes Network (ABN) models. The user may include a combination of as many NaiveBayesAlgorithmnSettings, Combination-NaiveBayesSettings (CNBS), AdaptiveBayesNetworkAlgorithmSettings, and CombinationAdaptive-BayesNetSettings (CABNS) instances in the specification as desired.
8. The ModelSeekerResult information for each model includes the following:
Model type, such as NB or ABN
Model name
Name of the corresponding TestResults object
Name of the corresponding LiftResults object
MiningFunctionSettings object, which contains a MiningAlgorithmSetting object, which is either a NaiveBayesAlgorithmSettings or an AdaptiveBayesNetworkAlgorithmSetttings object.
9. The "best" model is the one with the largest value for the figure of merit, calculated, for example, as described above.
10. If the asynchronous Model Seeker work fails to complete normally, the objects for the best model that had been found up to the failure are deleted, as well as the settings and result information for all the models that have been built and evaluated up to that time. Optionally, the user may cause Model Seeker to continue execution after an error, and retain models, settings and results obtained to that point or the user may specify that Model Seeker terminate when the error is detected, but that the models, settings and result information for the models that have been built and evaluated up to that time be kept, rather than deleted.
11. The inputs to the creation of the MST instance include two data sources, one used for building all of the models, and one used to perform the test and compute lift function for all of the models. Each of these sources can be either a view or a populated table, and each can be either in 2D or Transactional format.
12. The MST instance can accept numeric and categorical data and perform automated binning for non-target fields. However, any binning that is part of the user's pre-processing of data to create bin values meaningful to the application must be performed explicitly by the user/application outside of the Model Seeker feature.
13. Disk space is managed so that during an execution of Model Seeker 120 at most two of the models will have their corresponding model tables stored in the data mining database at any time.

Generating Names

Model seeker 120 will create many objects that require names. To support this requirement, Model seeker 120 includes the persistent class ModelSeekerTask. The various data mining methods that require a name for the object(s) to be created will use a name prefix that is passed into the ModelSeekerTask constructor, to create a name for each new object. If the name is not unique an exception is thrown.

The ModelSeekerTask execute method will generate new object names by concatenating a name prefix with an appropriate suffix to create a new unique name for each new object created by the MS execution.

Managing Database Space

Because each model built occupies one or more potentially large database tables, and the Model Seeker data mining feature can create a large number of models, a database space management technique is provided in order to avoid exhausting the space allocated to the data mining database schema. This technique keeps at any time at most two models in the database: (1) the model just built, and (2) the model that was previously the "best" model.

After the newly built model has been evaluated, and in particular, its Figure Of Merit is compared with that of the previous "best" model, the better of these two models, together with its result objects, are kept in the database, and the other model is deleted, buts its results are retained. After all models have been built and evaluated, only the surviving best model remains in the database. The settings and result objects for all models that were built by the execution are maintained in the database as named objects unless they are explicitly deleted by invoking the static ModelSeekerResult.remove method, which will remove all of these named objects along with the ModelSeekerResult object itself. Alternatively, individually named objects may be removed by the user/application by explicitly calling the appropriate API static remove method for the class of a named settings or result object.

Building Models

Model seeker 120 builds models based on model settings combinations, such as in step 208 of FIG. 2. The model settings combinations are embodied in one or more instances of a model settings objects, such as CNBS and CABNS instances. Examples of models specified by model settings object instances include:

a. A single NB model specified by a single value in the two variable arrays (singletonThresholdArray and airwiseThresholdArray).
b. A single ABN model specified by a single value for single variable array (maximumNetworkDepthArray).
c. A combination of NB models specified by multiple values in each of two variable arrays (singletonThresholdArray and pairwiseThresholdArray).
d. A combination of ABN models specified by multiple values in the single variable array (maximumNetworkDepthArray).

For the CNBS, an enum parameter will specify whether a model is to be built for (1) each combination pair of two value in the cross-product of the array values, or (2) for each pair consisting of values in the corresponding position in the arrays. (See example below.) Each pair of values causes a single model to be built and evaluated.

EXAMPLE

If the arrays are
(0.1, 0.2, 0.3) and (0.4, 0.5, 0.6)
If the enum is crossProduct then the following nine pairs are generated:
(0.1, 0.4), (0.1, 0.5), (0.1, 0.6), (0.2, 0.4), (0.2, 0.5), (0.2, 0.6), (0.3, 0.4), (0.3, 0.5), (0.3, 0.6).
If the enum is parallelPairs then the following three pairs are generated:
(0.1, 0.4), (0.2, 0.5), (0.3, 0.6).
If the enum is parallelPairs and the sizes of the two arrays are not equal, an exception is raised.

Evaluating Models

After each model is built in step 208 of FIG. 2, Model seeker 120 will invoke the SupervisedModel methods to evaluate the model in step 210 of FIG. 2. The evaluation methods include:
test
computeLift In addition to the results normally returned by these two methods, the following additional information will be calculated and saved for each model in the corresponding ModelSeekerResultEntry object:
time to build the corresponding model
Figure Of Merit The build method will measure the time to build the model as the time required to build with a SupervisedModel.build method, including any and all component data preprocessing activity. The test method will measure the time to build the model as the time required to build with a SupervisedModel.test method, including any and all component data preprocessing activity.

Model Seeker Results

Figure 4:
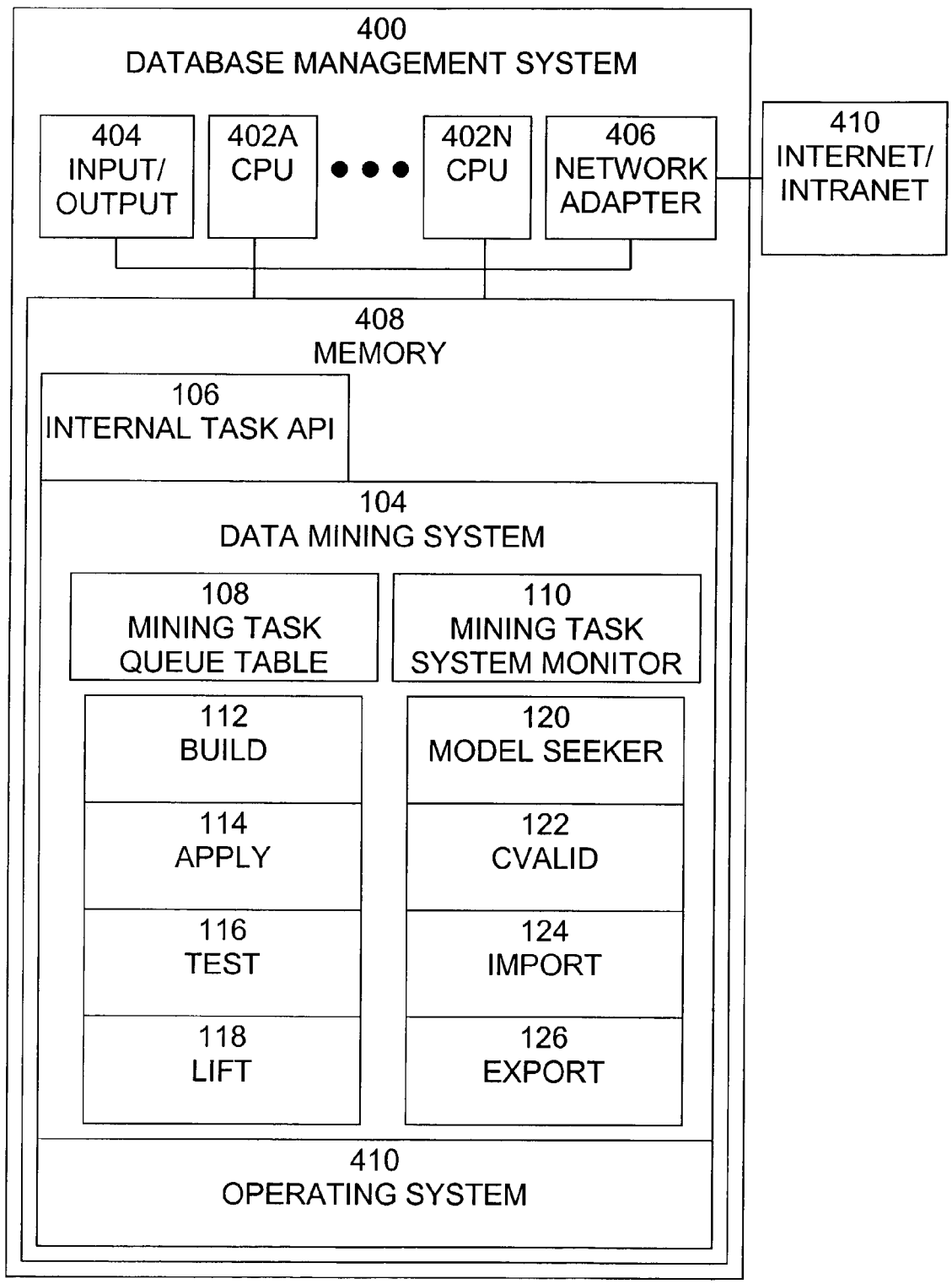
FIG. 4 is an exemplary block diagram of a database management system, in which the present invention may be implemented.

The results of completing the asynchronous Model Seeker activities is the creation and storing of an instance of the ModelSeekerResult object in step 216 of FIG. 2. This object will not be accessible by the user/application until after all asynchronous activity completes for the execution. The result object consists of three kinds of attributes:
information inherited from the MiningBuildResult class which corresponds to the MiningBuildResult for the "best" model
information common to all models
identification of the "best" model
an array of ModelSeekerResultEntry instances An exemplary block diagram of a database management system 400, in which the present invention may be implemented, is shown in FIG. 4. Database management system 400 is typically a programmed general-purpose computer system, such as a personal computer, workstation, server system, and minicomputer or mainframe computer. Database management system 400 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which database management system 400 is implemented as a single multi-processor computer system, in which multiple processors 402A-402N share system resources, such as memory 408, input/output circuitry 404, and network adapter 406. However, the present invention also contemplates embodiments in which database management system 400 is implemented as a plurality of networked computer systems, which may be single-processor computer systems, multi-processor computer systems, or a mix thereof.

Input/output circuitry 404 provides the capability to input data to, or output data from, data mining system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database management system 400 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of database management system 400. Memory 408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 4, memory 408 includes data mining system (DMS) 104 and internal task application program interface (API) 106. Data mining system 104 includes mining task queue table 108, mining system task monitor 110, and a plurality of mining tasks, such as build task 112, apply task 114, test task 116, lift computation task 118, model seeker task 120, cross-validation task 122, model import task 124, and model export task 126. Internal task API 106 provides an interface to data mining system 104 for internal database application in database system 102. External task API 128, shown in FIG. 1, provides similar functionality for external applications, which are external to database management system 102 and which communicate with data mining system 104 through database management system 102.

Data mining system 104 performs data mining tasks in accordance with the present invention. Data mining system 104 includes mining task queue table 108, which maintains the queues necessary for performing the data mining tasks. Internal task API 106 and external task API 128 provide an interface for applications to enqueue tasks into mining task data table 108, dequeue tasks from mining task data table 108, and manage tasks in mining task data table 108. Data mining system monitor 1110 performs browsing of mining task data table 108, dequeue of the tasks from mining task data table 108, monitoring of the currently executing the tasks in Data mining system 104, and executing the dequeued tasks.

Data mining system 104 provides asynchronous execution of data mining tasks, such as tasks 112-126. When the user executes a task, the task validates itself and then it will be enqueued for execution. Data mining system 104 preferably uses a First In First Out (FIFO) approach to execute the enqueued tasks. Data mining system 104 has configuration parameters to specify a maximum number of tasks that can be executed simultaneously.

Operating system 430 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for automatically building and evaluating data mining models for a data mining application comprising the steps of:
    receiving information to build models, wherein the information includes a type of model to be built and parameter values used to build the models, wherein the information for the type of model to be built specifies an algorithm from a plurality of algorithms to use to build the models;
    automatically, combining the received parameter values in a plurality of different ways to create a plurality of different combinations of parameter values;
    generating a plurality of model setting arrays where each array in the plurality of model setting arrays stores one of the combinations of the plurality of different combinations of parameter values;
    storing the plurality of model setting arrays;
    preparing specified source data for training and testing each model to be built;
    building a plurality of models using the algorithm by asynchronously using each model setting array in the plurality of model setting arrays to build a model in the plurality of models
    evaluating each of the built models using at least two evaluation functions, and
    incrementally outputting results of the model building and evaluation for each of the built models;
    selecting a model from among the plurality of built models based on a selection criterion relating to a quality or accuracy of each model; and
    outputting the selected model.

2. The method of claim 1, wherein the information specifying models to be built also comprises at least one of: datasets be used to build and test models, and parameters specifying evaluation criteria.

3. The method of claim 2, wherein the values of parameters used to build models comprises a series of values for the parameters or a range of values for the parameters.

4. The method of claim 1, further comprising preparing specified source data for training and testing each model in the plurality of built models by:
    mapping source data column values to standardized forms to be used in building the models, and performing automatic assignment of groups and/or ranges of values to collections and/or bins of values, each represented by an automatically assigned integer.

5. The method of claim 4, wherein the standardized forms comprise sequentially assigned integers.

6. The method of claim 1, wherein the evaluation functions comprise at least two of:
cumulative targets at a percentage of the population, a test of model accuracy, lift at a percentage of the population, time to build the model, and time to score the model.

7. The method of claim 1, wherein the selection criterion is to choose a model with a largest value of a weighted sum of positive and negative relative accuracy, where the weight is specified as a parameter or setting.

8. The method of claim 1, wherein the selection criterion comprises a figure of merit, FOM, wherein: FOM=

$$\frac{W*(\text{number-of-correct-positives})}{(W+1)*(\text{number-of-actual\_positives})} + \frac{(\text{number-of-correct-positives})}{(W+1)*(\text{number-of-actual-negatives})}$$

where W, the number-of-actual-positives, and the number-of-actual-negatives are each greater than zero.

9. The method of claim 8, wherein W is determined as a ratio of: a cost of predictions that are all correct except for a portion of negative predictions being false negatives, to a cost of predictions that are all correct except for a percentage of positive predictions being false positives.

10. The method of claim 1, wherein the step of selecting a model from among all the built models based on a selection criterion comprises the step of:
selecting a plurality of models from among all the built models based on the selection criterion.

11. A system for automatically building and evaluating data mining models for a data mining application comprising:
a processor operable to execute computer program instructions;
a memory operable to store computer program instructions executable by the processor; and
computer program instructions stored in the memory and executable to perform the steps of:
receiving information to build models, wherein the information includes a type of model to be built and parameter values used to build the models, wherein the information for the type of model to be built specifies an algorithm from a plurality of algorithms to use to build the models;
automatically, combining the received parameter values in a plurality of different ways to create a plurality of different combinations of parameter values;
generating a plurality of model setting arrays where each array in the plurality of model setting arrays stores one of the combinations of the plurality of different combinations of parameter values;
storing the plurality of model setting arrays;
preparing specified source data for training and testing each model to be built;
building a plurality of models using the algorithm by asynchronously using each model setting array in the plurality of model setting arrays to build a model in the plurality of models
evaluating each of the built models using at least two evaluation functions, and
incrementally outputting results of the model building and evaluation for each of the built models;
selecting a model from among the plurality of built models based on a selection criterion relating to a quality or accuracy of each model; and
outputting the selected model.

12. The system of claim 11, wherein the information specifying models to be built also comprises at least one of: datasets be used to build and test models, and parameters specifying evaluation criteria.

13. The system of claim 12, wherein the values of parameters used to build models comprises a series of values for the parameters or a range of values for the parameters.

14. The system of claim 11, further comprising preparing specified source data for training and testing each model in the plurality of built models by:
mapping source data column values to standardized forms to be used in building the models, and
performing automatic assignment of groups and/or ranges of values to collections and/or bins of values, each represented by an automatically assigned integer.

15. The system of claim 14, wherein the standardized forms comprise sequentially assigned integers.

16. The system of claim 11, wherein the evaluation functions comprise at least one of:
cumulative targets at a percentage of the population, a test of model accuracy, lift at a percentage of the population, time to build the model, and time to score the model.

17. The system of claim 11, wherein the evaluation function comprises at least two of:
cumulative targets at a percentage of the population, a test of model accuracy, lift at a percentage of the population, time to build the model, and time to score the model.

18. The system of claim 11, wherein the selection criterion is to choose a model with a largest value of a weighted sum of positive and negative relative accuracy, where the weight is specified as a parameter or setting.

19. The system of claim 11, wherein the selection criterion comprises a figure of merit, FOM, wherein: FOM=

$$\frac{W*(\text{number-of-correct-positives})}{(W+1)*(\text{number-of-actual\_positives})} + \frac{(\text{number-of-correct-positives})}{(W+1)*(\text{number-of-actual-negatives})}$$

where W, the number-of-actual-positives, and the number-of-actual-negatives are each greater than zero.

20. The system of claim 19, wherein W is determined as a ratio of a cost of predictions that are all correct except for a portion of negative predictions being false negatives, to a cost of predictions that are all correct except for a percentage of positive predictions being false positives.

21. The system of claim 11, wherein the step of selecting a model from among all the built models based on a selection criterion comprises the step of:
selecting a plurality of models from-among all the built models based on the selection criterion.

22. A computer program product for automatically building and evaluating data mining models for a data mining application, comprising:
a non-transitory computer readable storage medium;
computer program instructions, recorded on the computer readable medium, executable by a processor, for performing the steps of:

receiving information to build models, wherein the information includes a type of model to be built and parameter values used to build the models, wherein the information for the type of model to be built specifies an algorithm from a plurality of algorithms to use to build the models;

automatically, combining the received parameter values in a plurality of different ways to create a plurality of different combinations of parameter values;

generating a plurality of model setting arrays where each array in the plurality of model setting arrays stores one of the combinations of the plurality of different combinations of parameter values;

storing the plurality of model setting arrays;

preparing specified source data for training and testing each model to be built;

building a plurality of models using the algorithm by asynchronously using each model setting array in the plurality of model setting arrays to build a model in the plurality of models evaluating each of the built models using at least two evaluation functions, and incrementally outputting results of the model building and evaluation for each of the built models;

selecting a model from among the plurality of built models based on a selection criterion relating to a quality or accuracy of each model; and outputting the selected model.

23. The computer program product of claim 22, wherein the information specifying models to be built also comprises at least one of datasets be used to build and test models, and parameters specifying evaluation criteria.

24. The computer program product of claim 23, wherein the values of parameters used to build models comprises a series of values for the parameters or a range of values for the parameters.

25. The computer program product of claim 22, further comprising preparing specified source data for training and testing each model in the plurality of built models by:

mapping source data column values to standardized forms to be used in building the models, and performing automatic assignment of groups and/or ranges of values to collections and/or bins of values, each represented by an automatically assigned integer.

26. The computer program product of claim 25, wherein the standardized forms comprise sequentially assigned integers.

27. The computer program product of claim 22, wherein the evaluation at least two of:

cumulative targets at a percentage of the population, a test of model accuracy, lift at a percentage of the population, time to build the model, and time to score the model.

28. The computer program product of claim 22, wherein the selection criterion is to choose a model with a largest value of a weighted sum of positive and negative relative accuracy, where the weight is specified as a parameter or setting.

29. The computer program product of claim 22, wherein the selection criterion comprises a figure of merit, FOM, wherein: FOM=

$$\frac{W*(\text{number-of-correct-positives})}{(W+1)*(\text{number-of-actual\_positives})} + \frac{(\text{number-of-correct-positives})}{(W+1)*(\text{number-of-actual-negatives})}$$

where W, the number-of-actual-positives, and the number-of-actual-negatives are each greater than zero.

30. The computer program product of claim 29, wherein W is determined as a ratio of:

a cost of predictions that are all correct except for a portion of negative predictions being false negatives, to a cost of predictions that are all correct except for a percentage of positive predictions being false positives.

31. The computer program product of claim 22, wherein the step of selecting a model from among all the built models based on a selection criterion comprises the step of:

selecting a plurality of models from among all the built models based on the selection criterion.

* * * * *

UNITED STATES PATENT AND TRADEMARK OFFICE
CERTIFICATE OF CORRECTION

| | | |
|---|---|---|
| PATENT NO. | : 7,756,804 B2 | Page 1 of 2 |
| APPLICATION NO. | : 10/383641 | |
| DATED | : July 13, 2010 | |
| INVENTOR(S) | : Burton H. Bloom et al. | |

It is certified that error appears in the above-identified patent and that said Letters Patent is hereby corrected as shown below:

In column 14, line 62, delete "electromechanical" and insert -- electro-mechanical --, therefor.

In column 15, line 26, delete "1110" and insert -- -110 --, therefor.

In column 17, line 19-23, in claim 8, delete "$\frac{W*(number\text{-}of\text{-}correct\text{-}positives)}{(W+1)*(number\text{-}of\text{-}actual\_positives)} + \frac{(number\text{-}of\text{-}correct\text{-}positives)}{(W+1)*(number\text{-}of\text{-}actual\text{-}negatives)}$ ,, and insert -- $\frac{W*(number\_of\_correct\_positives)}{(W+1)*(number\_of\_actual\_positives)} + \frac{(number\_of\_correct\_positives)}{(W+1)*(number\_of\_actual\_negatives)}$ --, therefor.

In column 17, line 25, in claim 8, delete "number-of-actual-positives" and insert -- number_of_actual_positives --, therefor.

In column 17, line 25-26, in claim 8, delete "number-of-actual-negatives" and insert -- number_of_actual_negatives --, therefor.

In column 18, line 42-46, in claim 19, delete "$\frac{W*(number\text{-}of\text{-}correct\text{-}positives)}{(W+1)*(number\text{-}of\text{-}actual\_positives)} + \frac{(number\text{-}of\text{-}correct\text{-}positives)}{(W+1)*(number\text{-}of\text{-}actual\text{-}negatives)}$ ,, and insert -- $\frac{W*(number\_of\_correct\_positives)}{(W+1)*(number\_of\_actual\_positives)} + \frac{(number\_of\_correct\_positives)}{(W+1)*(number\_of\_actual\_negatives)}$ --, therefor.

Signed and Sealed this
Third Day of May, 2011

David J. Kappos
*Director of the United States Patent and Trademark Office*

CERTIFICATE OF CORRECTION (continued)
U.S. Pat. No. 7,756,804 B2

In column 18, line 49, in claim 19, delete "number-of-actual-positives" and insert -- number_of_actual_positives --, therefor.

In column 18, line 49-50, in claim 19, delete "number-of-actual-negatives" and insert -- number_of_actual_negatives --, therefor.

In column 18, line 52, in claim 20, delete "of" and insert -- of: --, therefor.

In column 18, line 59, in claim 21, delete "from-among" and insert -- from among --, therefor.

In column 19, line 31, in claim 23, delete "of" and insert -- of: --, therefor.

In column 20, line 21-25, in claim 29, delete "$\frac{W*(\text{number-of-correct-positives})}{(W+1)*(\text{number-of-actual\_positives})} + \frac{(\text{number-of-correct-positives})}{(W+1)*(\text{number-of-actual-negatives})}$"

and insert -- $\frac{W*(\text{number\_of\_correct\_positives})}{(W+1)*(\text{number\_of\_actual\_positives})} + \frac{(\text{number\_of\_correct\_positives})}{(W+1)*(\text{number\_of\_actual\_negatives})}$ --, therefor.

In column 20, line 27, in claim 29, delete "number-of-actual-positives" and insert -- number_of_actual_positives --, therefor.

In column 20, line 27-28, in claim 29, delete "number-of-actual-negatives" and insert -- number_of_actual_negatives --, therefor.